S. F. BRENNO.
STUBBLE PLOW.
APPLICATION FILED MAR. 31, 1916.
1,237,610.
Patented Aug. 21, 1917.
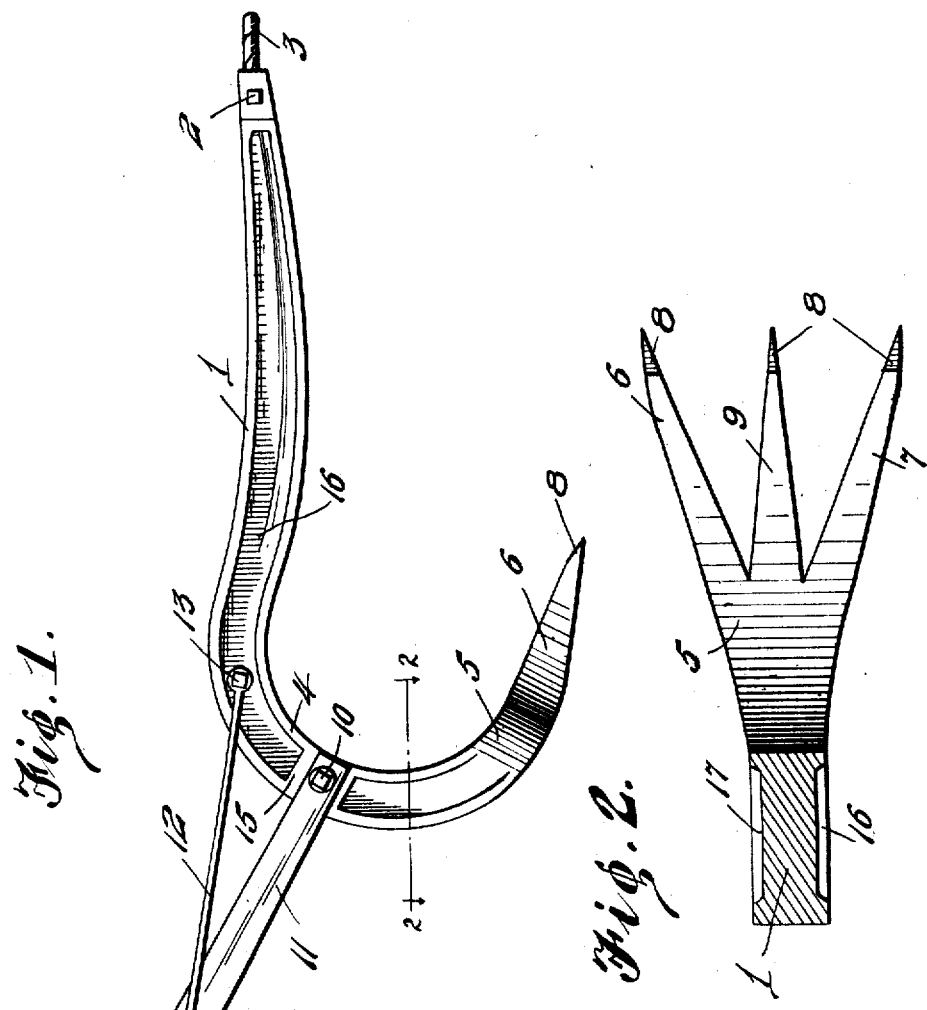
WITNESSES
R. D. Spaulding.
INVENTOR
Sigurd F. Brenno,
BY Richard B. Owen.
ATTORNEY

UNITED STATES PATENT OFFICE.

SIGURD F. BRENNO, OF PEQUOT, MINNESOTA.

STUBBLE-PLOW.

1,237,610.

Specification of Letters Patent. Patented Aug. 21, 1917.

Application filed March 31, 1916. Serial No. 88,155.

*To all whom it may concern:*

Be it known that I, SIGURD F. BRENNO, a citizen of the United States, residing at Pequot, in the county of Crow Wing and State of Minnesota, have invented certain new and useful Improvements in Stubble-Plows, of which the following is a specification.

My invention relates to improvements in stubble plows, and it consists in the constructions and arrangements herein described and claimed.

The primary object of the invention is to provide a stubble plow of the character described, which is simple and inexpensive in construction, strong and durable in use, efficient for the purpose designed, and which, due to its construction, may be manufactured at a minimum cost.

Other important characteristics of the invention reside in the construction of the stubble pulling shovel, which is formed to provide for a plurality of prongs, which prongs are adapted to break the surface of the ground and to free, or clear, the same of weeds, brush, or roots and the like.

The invention also contemplates the provision of a stubble plow which may be constructed in one piece, the beam of the plow being bent or curved upon itself, and cast or otherwise formed, to constitute the pronged shovel construction.

The invention may be stated briefly to comprise a beam, which beam is bent upon itself and has arranged upon the lower extremity thereof a flat shovel construction, which shovel construction, comprises a plurality of earth working fingers.

The invention will be clearly understood from the following detailed description, when considered in connection with the accompanying drawing forming a part thereof and illustrating one embodiment of the invention.

In the drawings:—

Figure 1 is a side elevation; and

Fig. 2 is a transverse section, taken on the line 2—2 of Fig. 1.

Referring now more particularly to the drawings, wherein like or corresponding parts are represented by like or corresponding numerals throughout the various views, I provide a beam portion, as designated at 1, which beam portion has arranged upon its outer end, and secured thereto, as at 2, a suitable clevis, or like connection 3. The remaining end of the beam 1 is curved upon itself as at 4, and has formed thereupon, a shovel portion 5, which portion comprises a substantially divergent member, which is provided, upon either side, with divergent fingers 6 and 7, which have their ends pointed, or sharpened, as at 8, thereby facilitating the working of the earth. Arranged intermediate the divergent fingers 6 and 7, and formed upon the shovel portion 5, is a centrally arranged earth working finger 9, which is also provided with, at its outer end, a sharpened portion 8. Secured intermediate the curved portion 4 of the beam 1 by means of bolts or other connections as at 10, is a handle 11. The handle 11 is provided with additional bracing means whereby the handle may be firmly connected to the plow beam, by rod 12. The rod is in turn secured to the beam as at 13, by means of some suitable fastening devices, and to the handle, as at 14, by similar fastening devices. To provide for means whereby the handle 11 may be readily positioned upon the curved portion 4 of the beam, I provide a flat portion as shown at 15, thereby offering a firm connection between the cultivator and the handle. In constructing the beam of the cultivator, I preferably cast the beam 1 and the curved portion 4, with channeled sides 16 and 17, thereby strengthening and also offering a light implement. While I have described the device, as being preferably cast, it is of course to be understood that I do not desire to limit the construction to this particular method, but may employ any suitable method, such as conditions or preferences may dictate.

From the foregoing, it will be appreciated by workers in the art, that I have provided a cultivator which will efficiently serve for the purpose for which it is designed and which, due to the simple manner in which it is constructed, will prove profitable to both the manufacturer and the user.

It will be understood that the drawings illustrate a preferred embodiment of the invention, but that minor changes in this particular construction and arrangements of parts may be made without departing from the spirit of the invention, or the scope of the appended claim.

Having thus fully described my invention, what I claim to be new and desire to secure by Letters Patent, is:—

A single-piece stubble plow including a beam having one end thereof curved downwardly and forwardly and flattened transversely and terminating in a tri-pronged shovel, the shovel including a central finger and lateral prongs extending in divergent directions, the width and thickness of the prongs constantly diminishing toward the prong tips, seats formed upon the plow beam, handles secured in the seats, and braces for the handles.

In testimony whereof I affix my signature in presence of two witnesses.

SIGURD F. BRENNO.

Witnesses:
A. R. HOLMON,
GLADYS HOLMAN.